United States Patent [19]

Hrustich et al.

[11] Patent Number: 4,639,856
[45] Date of Patent: Jan. 27, 1987

[54] DUAL STREAM PROCESSOR APPARATUS

[75] Inventors: John Hrustich, Endicott; Wayne R. Sitler, Endwell, both of N.Y.

[73] Assignee: International Business Machines Corporation, Armonk, N.Y.

[21] Appl. No.: 548,748

[22] Filed: Nov. 4, 1983

[51] Int. Cl.⁴ .............................................. G06F 11/00
[52] U.S. Cl. .................................................... 364/200
[58] Field of Search .................... 371/14, 16; 364/200, 364/900

[56] References Cited

U.S. PATENT DOCUMENTS 4,385,351 5/1983 Matsuura ............................ 364/200
4,400,775 8/1983 Nozaki ................................ 364/200
4,443,849 4/1984 Ohwada ............................. 364/200

Primary Examiner—James D. Thomas
Assistant Examiner—Emily Yue Chan
Attorney, Agent, or Firm—John H. Bouchard

[57] ABSTRACT

A dual stream processor apparatus, for use in a multiprocessor computer system, is disclosed. The multiprocessor computer system includes at least a first processor and a second processor. A first apparatus and a second apparatus is included in both the first processor and the second processor for use when either the first or the second processor is inoperative. The first apparatus, disposed within the inoperative processor, suspends the functional operation of the inoperative processor. The second apparatus, disposed within the inoperative processor, transmits a miss signal to the other remaining functionally operational processor. When the other remaining processor receives the miss signal, it will not subsequently attempt to locate desired data in the cache of the inoperative processor. Rather, the other remaining processor will search for the desired data in the main memory in the event it cannot locate the data in its own cache.

3 Claims, 7 Drawing Figures

DUAL STREAM PROCESSOR APPARATUS

BACKGROUND OF THE INVENTION

1. Field of the Invention

The present invention pertains to a multiprocessor computer system, and more particularly, to an apparatus within said multiprocessor computer system for disabling one processor of the multiprocessor computer system when the one processor fails and for informing the remaining processors of the multiprocessor system of the failure within the one processor.

2. Description of the Prior Art

In a multiprocessor computer system, such as that which is disclosed in British Patent Specification No. 1,163,859 published Sept. 10, 1969, two or more processors are utilized for the execution of instructions stored in a main memory. In some multiprocessor computer systems, during normal machine operation, if one processor requires certain data during the execution of an instruction, it may search its cache for the data necessary to execute the instruction. If it fails to find the data, it may search the cache of the other processors for the data. If the data is not found in the cache of the other processors, the one processor may search the main memory for the data. However, if a failure occurs within the one processor, the entire computer system may be non-functional, even though the other processors are functional and available for use. Furthermore, even though the one processor is non-functional, the other processors may continue to search the cache of said one processor for data thereby consuming time during the execution of an instruction.

SUMMARY OF THE INVENTION

Accordingly, it a primary object of the present invention to disable a processor and to continue utilizing the remaining processors of a multiprocessor computer system in the event of a failure within said processor.

It is another object of the present invention to generate a "miss" signal from the failing processor, the miss signal energizing the remaining processors thereby preventing any further searches for data in the cache of the failing processor by the remaining processors.

In accordance with these and other objects of the present invention, a service processor 11 within said computer system stores information relative to the operational condition of said computer system. The service processor 11 sets a pair of latches disposed within a failing processor of the multiprocessor computer system. One latch generates an output signal which disables the failing processor. The other latch generates a "miss" signal energizing the remaining processors. The miss signal is generated following a failure within the processor and prevents any further searches for data in the cache of the failing processor by the remaining processors. When one of the remaining processors fail to find a set of data within its own cache, in view of the miss signal generated from the failing processor, the remaining processor will not search the cache of the failing processor and will immediately search the main memory for the data. Consequently, when a failure occurs within one of the processors of a multiprocessor system, the computer system will remain functional, although it will function at a reduced performance level.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from a reading of the detailed description given hereinbelow and the accompanying drawings, which are given by way of illustration only, and thus are not limitative of the present invention, and wherein.

DESCRIPTION OF THE PREFERRED EMBODIMENT

Figure 1:
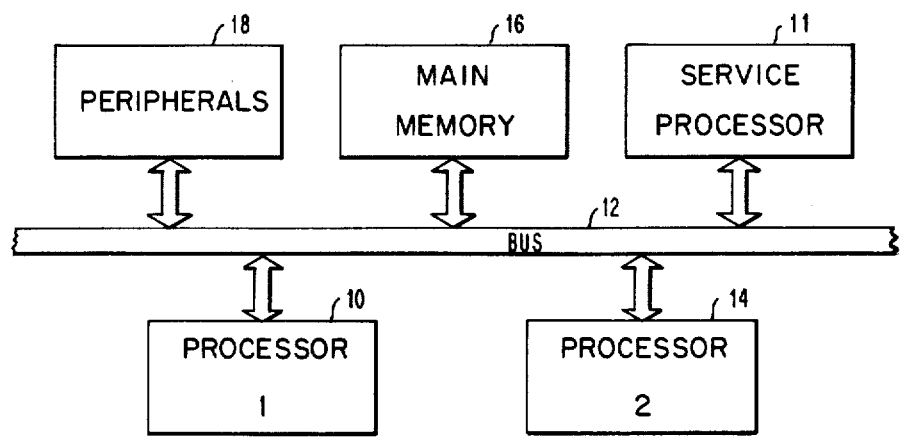
FIG. 1 illustrates one embodiment of a multiprocessor system within a computer system.

Referring to FIG. 1, a multiprocessor system disposed within a computer system is illustrated. A first processor 10 is connected to a system bus 12. A second processor 14 is also connected to the system bus 12. A main memory 16 is connected to the bus 12. In addition, various peripheral devices 18 are connected to the bus 12, such as a terminal or a printer. A service processor 11 is connected to the bus 12. The multiprocessor system configuration shown in FIG. 1 is further illustrated and discussed in a set of technical manuals directed to the maintenance of the IBM 3033 computer, the technical manuals being identified by numbers SY227001, SY227002, SY227003, SY227004, SY227005, SY227006 and SY227007. The disclosures in these technical manuals are incorporated by reference into the specification of this application.

Figure 2:
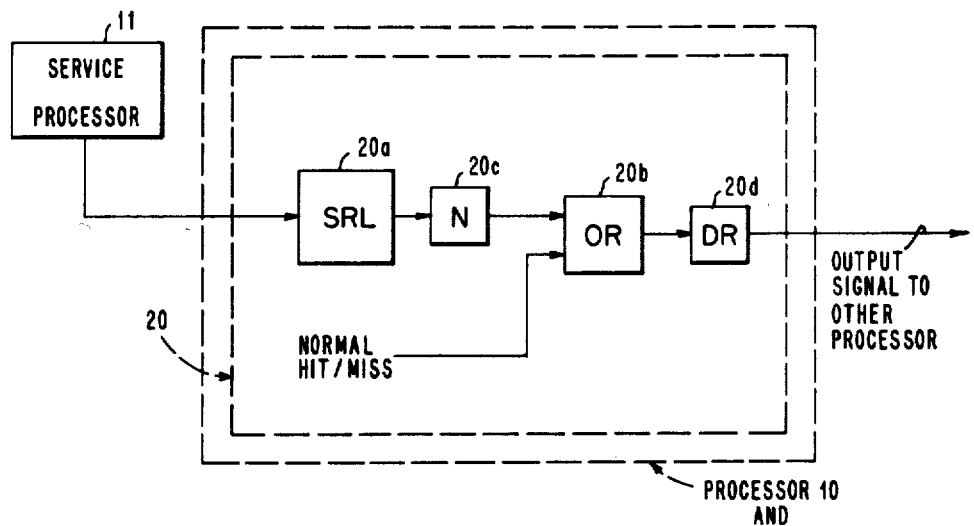
FIG. 2 illustrates an apparatus disposed within each of the processors of FIG. 1 for generating a "miss" signal, the miss signal being generated from a processor in the event of a failure within the processor, the miss signal preventing any further searches for data in the cache of the processor by the remaining processor.

Referring to FIG. 2, an apparatus 20, disposed within the first processor 10 and within the second processor 14, is illustrated. The apparatus 20 functions to generate a "hit" or "miss" signal. The hit or miss signal is generated by a processor and energizes the other remaining processors in the multiprocessor system. A miss signal is generated by a first processor following a failure within the first processor or when an unsuccessful attempt has been made to locate data in the cache of the first processor. When a miss signal is generated following a failure within the first processor, further searches for data in the cache of the first processor by the other processor are precluded. As a result, if the other processor fails to locate the data within its own cache, it will immediately attempt to locate the data within the main memory. Alternatively, in the event there is no failure in the first processor, if the other processor searches the cache of the first processor for specific data and locates the data, the apparatus 20, disposed within the first processor, generates the hit signal informing the other processor of the successful location of the specific data. However, if the specific data is not located, the apparatus 20, disposed within the first processor, generates the miss signal indicative of the failure to locate the specific data.

In FIG. 2, the apparatus 20 includes a first latch circuit 20a connected to a service processor 11. The construction of latch circuit 20a is identical to the construction of latch circuit 30d to be described and illustrated with reference to FIG. 3 in the paragraphs below. The service processor 11 is disposed within the computer system and stores information relative to the operational condition of said computer system. Details regarding the structure and operation of the service processor 11 may be found in a manual entitled "4341 IBM Maintenance Information", Vol. 17 general information, Part No. 0446840, November 1981, pages 1 through 14, the disclosure of which is incorporated by reference into the specification of this application. The first latch circuit 20a is connected to an OR gate 20b via an inverter circuit 20c. The OR gate 20b is connected to a driver circuit 20d, the driver circuit generating a hit or miss signal.

If the apparatus 20 is disposed within the first processor 10, the miss signal, indicative of an inoperative first processor 10, energizes the second processor 14.

Alternatively, a "normal hit/miss" signal may energize the OR gate 20b. If the second processor 14 searches the cache of the first processor 10 for the existence of stored data, and locates the stored data, a "normal hit" signal energizes the OR gate 20b of apparatus 20 disposed within the first processor 10. A hit signal is generated from the driver circuit 20d of apparatus 20 disposed within the first processor 10 indicative of the existence of the stored data. The hit signal energizes the second processor 14 informing the second processor of the existence of the stored data within the first processor 10.

If the second processor 14 fails to locate the stored data within the first processor 10, a "normal miss" signal energizes the OR gate 20b of apparatus 20 disposed within the first processor 10. A miss signal is generated from the driver circuit 20d disposed within the first processor 10 indicative of the failure to locate the stored data. As indicated, the miss signal from the driver circuit 20d of the first processor 10 energizes the second processor 14 informing the second processor of the failure to locate the stored data.

Figure 3:
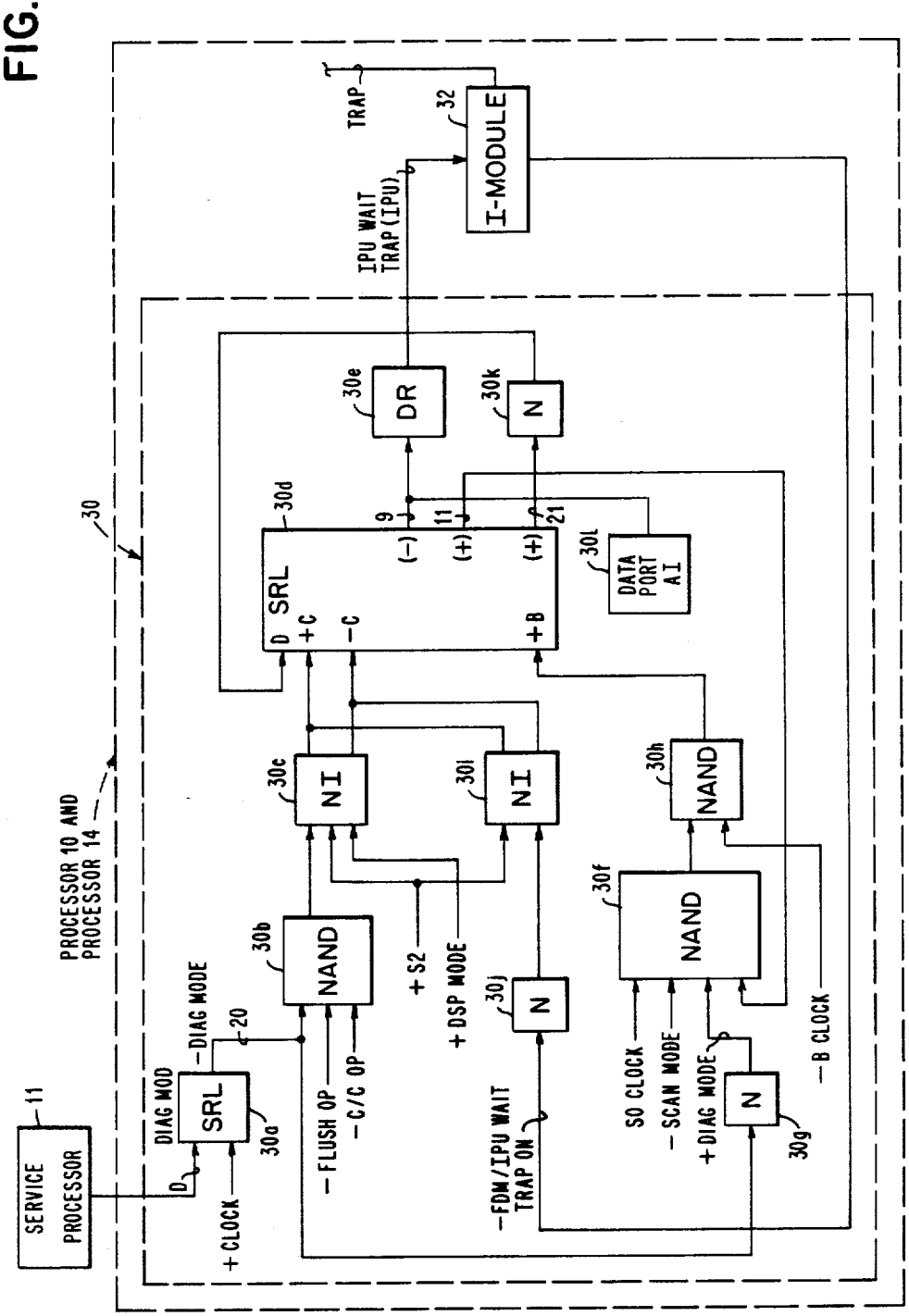
FIG. 3 illustrates an apparatus disposed within each of the processors of FIG. 1 for disabling a processor in the event of a failure within the processor.

Referring to FIG. 3, another apparatus 30, disposed within the first processor 10 and within the second processor 14, is illustrated. The apparatus 30 is connected to the service processor 11, which stores information relative to the operational condition of the computer system. If the service processor 11 indicates that the first processor 10 or the second processor 14 is inoperative, the apparatus 30, disposed within the first processor and the second processor, generates an output (trap) signal disabling the inoperative processor, that is, either processor 10 or processor 14. The apparatus 30 includes a latch circuit 30a connected, at one input, to the service processor 11. The latch circuit 30a receives a "+clock" signal at another of its input terminals and is connected, at its output, to an input of NAND gate 30b. A "flush op" signal and a "cache to cache (c/c) op" signal also energize inputs of NAND gate 30b. When data exists in the cache of one processor and the data is needed, the flush op signal transfers the data from the cache of the one processor to main memory wherein the data may be retrieved. However, the cache to cache op signal will transfer the data from the cache of the one processor to the cache of the other processor. An output terminal of the NAND gate 30b is connected to an input of a NAND-invert circuit 30c. A +S2 signal and a +DSP mode signal energize further inputs of the NAND-invert circuit 30c. The +S2 signal provides a clock signal to the latch circuit 30d and the +DSP mode signal provides a gate signal to NAND invert circuit 30c when the system is configured as a dual service processor. An output terminal of the NAND-invert circuit 30c is connected to the +C input terminal of a further latch circuit 30d. A further output terminal of the NAND-invert circuit 30c is connected to the −C input terminal of the further latch circuit 30d. A further NAND-invert circuit 30i is connected, at its output, to the +C and the −C input terminal of the further latch circuit 30d. The further NAND-invert circuit 30i receives the +S2 signal referenced above. An inverter circuit 30j receives an "−FDM/IPU WAIT TRAP ON" signal at its input terminal and develops an output signal energizing the further NAND-invert circuit 30i.

An output terminal of the further latch circuit 30d, terminal 9, is connected to a driver circuit 30e, the driver circuit 30e generating an output signal energizing an I-module 32. The I-module generates a trap signal suspending the operation of the processor in which it is disposed, that is, either the first processor 10 or the second processor 14. The output trap signal from the I-module 32 prevents the next instruction from being executed or prevents the current instruction from being re-executed by the processor in which it is disposed. Consequently, the operation of the processor is suspended. The I-module 32 also generates the "−FDM/IPU WAIT TRAP ON" signal, referenced earlier in this discussion, which energizes the inverter 30j. Details regarding the construction and operation of the I-module may be found in a technical manual entitled "4341 IBM Maintenance Information", Vol. 17 general information, Part No. 0446837, pages 1 through 5, the disclosure of which is incorporated by reference into the specification of this application. In this manual, the I-module is referred to as an "Instruction Processor".

The latch circuit 30a is further connected to NAND circuit 30f via an inverter circuit 30g. The latch circuit 30a generates an output signal labelled "diag mode" energizing the inverter circuit 30g. Output terminal 11 of latch circuit 30d is connected to another input terminal of NAND circuit 30f. Two other signals energize further input terminals of the NAND circuit 30f, that is, "S0 clock" and "−SCAN mode". The S0 clock represents a series of clock pulses. When SCAN mode is present, the contents of the registers of FIG. 3 are each input to another register, not shown, for the purpose of examining the contents for accuracy. An inaccurate reading from one register may indicate the existence of an erroneous condition within the processor in which it is disposed. An output terminal of the NAND circuit 30f is connected to an input terminal of another NAND circuit 30h. A further input terminal of the NAND circuit 30h is connected to a clock signal generator (−B clock). The output terminal of NAND circuit 30h is connected to a +B input terminal of latch circuit 30d. Output terminal 21 of latch circuit 30d is connected to input terminal D of latch circuit 30d via an inverter 30k.

A data port AI 30L, connected to output terminal 9 of latch circuit 30d, provides for additional function inputs to set and reset the latch circuit 30d. This port is referred to as an extender.

Figure 5:
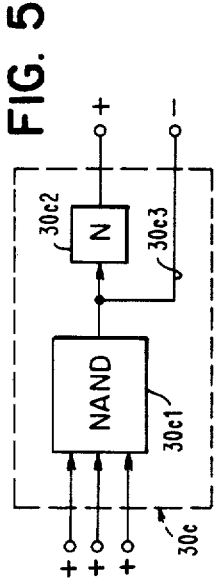
FIGS. 4 and 5 illustrate the construction of the NAND-invert circuits of FIG. 3.
Figure 4:
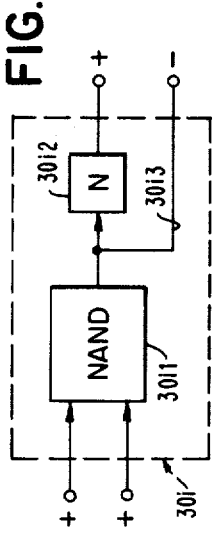

Referring to FIGS. 4 and 5, the construction of the NAND-invert circuits 30i and 30c of FIG. 3 is illustrated. In FIGS. 4 and 5, each of the NAND-invert circuits 30i and 30c comprise a NAND gate 30i1, 30c1, and an inverter 30i2, 30c2, connected to the output terminal of the NAND gate. Another output lead 3013, 30c3 is connected to the output terminal of the NAND circuit 30i1, 30c1.

Figure 7:
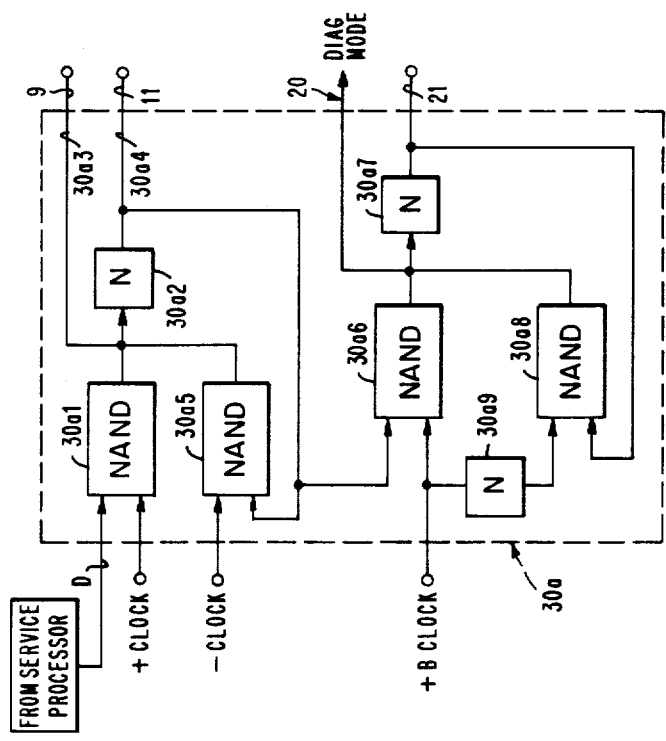
FIGS. 6 and 7 illustrate the construction of the latch circuits of FIG. 3.
Figure 6:
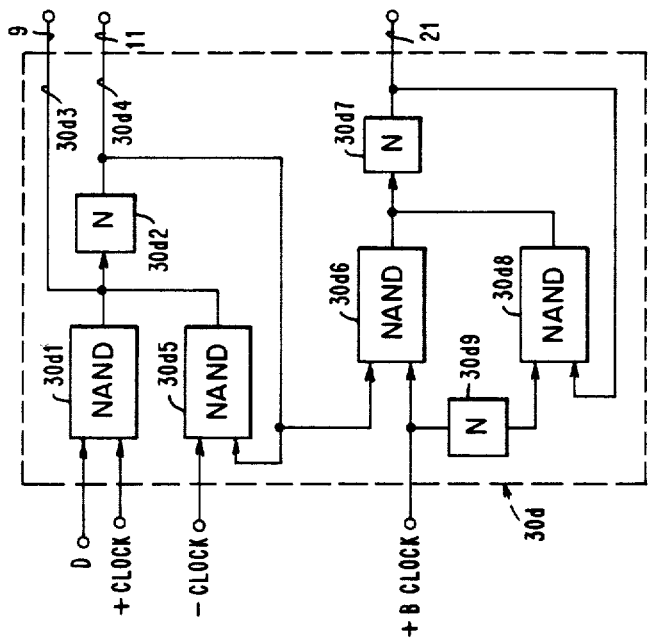

Referring to FIGS. 6 and 7, the construction of the latch circuits 30d and 30a is illustrated. In FIGS. 6 and 7, each of the latch circuits 30d and 30a comprise a NAND circuit 30d1, 30a1, each of these NAND circuits receiving a clock pulse signal (+clock) at one input terminal and a signal labelled "D" at another input terminal. The signal "D" energizing NAND circuit 30a1 represents an output signal of the service processor 11 of FIG. 3. The output terminal of NAND circuit 30d1, 30a1 is connected to an inverter 30d2, 30a2 and to an output lead 30d3, 30a3. The output terminal of inverters 30d2, 30a2 is connected to another output lead 30d4, 30a4. In FIG. 6, output lead 30d3 represents output terminal 9 of FIG. 3 whereas output lead 30d4 represents output terminal 11 of FIG. 3. Another NAND circuit 30d5, 30a5 is connected to the junction between NAND circuit 30d1, 30a1 and inverter 30d2, 30a2, this NAND circuit receiving a "−clock" signal at one of its input terminals. A further input terminal of NAND circuit 30d5, 30a5 is connected to output lead 30d4, 30a4 of inverter 30d2, 30a2. This further input terminal of NAND circuit 30d5, 30a5 is connected to an input terminal of NAND circuit 30d6, 30a6. A further input terminal of NAND circuit 30d6, 30a6 is connected to a "+B clock". The input terminal of NAND circuit 30a6 is labelled "D" and is connected to the service processor 11 of FIG. 3. An output terminal of NAND circuits 30d6, 30a6 is connected to an inverter 30d7, 30a7. The output terminal of inverter 30d7 is connected to an output lead representing output terminal 21 of latch circuit 30d. The output terminal of NAND circuit 30a6 develops the "DIAG MODE" output signal, the output signal of the latch circuit 30a of FIG. 3. The further input terminal of NAND circuit 30d6, 30a6 is connected to an input terminal of another NAND circuit 30d8, 30a8 via an inverter 30d9, 30a9. A further input terminal of NAND circuit 30d8, 30a8 is connected to the output terminal of inverter 30d7, 30a7. The output terminal of NAND circuit 30d8, 30a8 is connected to the output terminal of NAND circuit 30d6, 30a6.

A functional description of the operation of apparatus 20 and apparatus 30 disposed within the first processor 10 and the second processor 14 is provided in the paragraphs below with reference to FIGS. 1 through 7 of the drawings.

Assume that a failure occurs within processor 10. Various sensing devices within the computer system inform the service processor 11 of the failure within processor 10. Service processor 11 transmits a signal to processor 10 via bus 12. Apparatus 20, disposed within processor 10, receives the signal from the service processor 11 and sets latch 20a of FIG. 2. The latch 20a generates a signal, which is inverted via inverter 20c. The inverted signal from inverter 20c energizes one input of OR gate 20b. The OR gate generates an output signal therefrom energizing driver circuit 20d. The driver circuit 20d develops its output signal representing the "miss" signal, the "miss" signal energizing processor 14. If processor 14 subsequently attempts to locate data in its own cache and fails to locate the data, due to the presence of the "miss" signal, processor 14 will not attempt to locate data in the cache of processor 10. Rather, it will read the desired data from the main memory 16. In addition, when the service processor 11 transmits the signal to processor 10, apparatus 30, disposed within processor 10, also receives the signal. In response thereto, the apparatus 30 generates an output signal which energizes the I-module 32. As a result, the I-module 32 generates a trap signal, the trap signal suspending the operation of the processor 10. However, processor 14 remains functionally operational. Therefore, the computer system of the present invention remains functional, albeit at a reduced performance level. The computer system of FIG. 1 operates as a uniprocessor system, rather than a multi-processor system.

The functional operation of the apparatus 30, in generating its output signal for energizing the I-module 32, will be described in the following paragraphs with reference to FIGS. 3 through 7 of the drawings. Apparatus 30 of FIGS. 3 through 7 comprises a plurality of NAND gates. Each of these NAND gates possess the following truth table:

|   | + | − |
|---|---|---|
| + | − | + |
| − | + | + |

As previously stated, when processor 10 becomes inoperative, service processor 11 transmits an output signal to processor 10 via bus 12. Apparatus 30, disposed within processor 10, receives the output signal. Referring to FIG. 3, assume that the output signal is positive. The positive output signal energizes terminal "D" of latch 30a. When the positive clock signal energizes the other input terminal of latch 30a, NAND circuit 30a1 of FIG. 7 generates a negative output signal, the negative output signal being inverted by inverter 30a2. A positive signal is the result. This positive signal in addition to a positive signal output from the service processor 11 energizes one input terminal of NAND circuit 30a6. When the positive clock signal of "+B clock" energizes the further input terminal of NAND circuit 30a6, a negative output signal is generated from NAND circuit 30a6. This negative output signal represents the negative output signal labelled "diag mode" generated from output terminal 20 of latch circuit 30a in FIG. 3. The negative "diag mode" output signal energizes one input terminal of NAND circuit 30b. Referring to the truth table for a NAND circuit, the output signal from NAND circuit 30b must be positive. This positive output signal energizes one input terminal of the NAND-invert circuit 30c. A positive signal energizes the other two input terminals of the NAND-invert circuit 30c. Referring to FIG. 5 and to the truth table for NAND circuits, referenced above, the output signal from NAND circuit 30c1 is negative. However, this negative output signal is inverted by inverter 30c2 to a positive signal. Therefore, a positive signal appears on one output terminal of NAND-invert circuit 30c energizing input terminal +C of latch circuit 30d whereas a negative signal appears on the other output terminal of NAND-invert circuit 30c energizing input terminal −C of latch circuit 30d. At this point, the input terminal "D" of latch circuit 30d is positive. Therefore, NAND circuit 30d1 generates a negative output signal. The negative output signal is inverted by inverter 30d2 such that a positive signal appears at output terminal 11 of latch 30d and a negative output signal appears at output terminal 9 of latch 30d. As a result of the negative signal appearing on output terminal 9 of latch 30d, driver circuit 30e develops an output signal. Therefore, I-module 32 develops a trap signal. The trap signal suspends the operation of processor 10, preventing the current instruction from being re-executed or the next instruction from being initially executed.

The positive output signal from inverter 30d2 energizes one input terminal of NAND circuit 30d6. However, the "+B clock" has not yet energized the other input terminal of NAND circuit 30d6. At this point in time, the positive output signal appearing on output terminal 11 of latch 30d energizes the other input terminal of NAND circuit 30f. The negative "diag mode" output signal from latch circuit 30a is inverted by inverter 30g. Therefore, a positive "diag mode" signal energizes one input terminal of NAND circuit 30f. At this point in time, a positive signal energizes the "scan mode" input terminal of NAND circuit 30f.

When the input signal "SO clock" is introduced as a positive input signal to NAND circuit 30f, in accordance with the truth table of a NAND circuit, a negative output signal appears on the output terminal of NAND circuit 30f. The negative output signal energizes one input terminal of NAND circuit 30h. As a result, a positive signal is generated at the output terminal of NAND circuit 30h, this positive signal representing the signal "+B clock" energizing the "+B" input terminal of latch circuit 30d. This "+B clock" signal energizes the other input terminal of NAND circuit 30d6. Since a positive signal, from the output of inverter 30d2, energizes the one input terminal of NAND circuit 30d6, a negative output signal is generated from NAND circuit 30d6. This negative output signal is inverted by inverter 30d7. As a result, a positive signal appears on output terminal 21 of latch circuit 30d. The positive signal on output terminal 21 is inverted by inverter 30k. Therefore, a negative signal energizes the "D" input terminal of latch 30d (a positive signal originally energized the "D" input terminal). The +C input terminal of latch 30d remains positive and the −C input terminal of latch 30d remains negative. As a result, output terminal 9 of latch 30d goes positive and output terminal 11 of latch 30d goes negative. The latch 30d is reset and generation of the trap signal from the I-module 32 is terminated. When output terminal 21 of latch circuit 30d goes negative, a positive signal appears on input terminal "D" of latch circuit 30d. As a result, output terminal 9 of latch 30d goes negative and output terminal 11 of latch 30d goes positive. The trap signal is again generated from the I-module 32.

The function of inverter 30j and NAND-invert circuit 30i, in this sequence, is to reset the IPU WAIT TRAP latch 30d, via NAND-invert circuit 30i and inverter circuit 30j, when the I-module 32 responds to the trap request and generates the trap signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a multiprocessor computer system including a plurality of processors, service processor means connected to the plurality of processors for developing an output signal in the event a failure occurs within one of the processors, a main memory connected to the plurality of processors for supplyihg instructions and data, I-module means disposed within each of the processors for preventing a current instruction from being re-executed and a next instruction from being executed in response to a trap signal, and control means disposed within each of the processors for controlling the operation of the processor, remaining ones of said plurality of processors attempting to search for data in the one processor prior to searching for the data in the main memory, said control means of the one processor comprising:

first means connected to said service processor means for transmitting a special signal from the one processor to the remaining ones of said plurality of processors in the event said failure occurs within the one processor in response to said output signal from said service processor means, said remaining ones of said plurality of processors neglecting to search for the data in the one processor and searching for the data in the main memory in response to said special signal from said first means of said one processor, said first means including, latch circuit means for generating a set signal in response to said output signal from said service processor means, and gate means for generating an output signal in response to said set signal, said first means transmitting said special signal in response to said output signal from said gate means.

2. The control means of claim 1, further comprising:

second means connected to said service processor means for generating said trap signal in the event said failure occurs within the one processor in response to said output signal from said service processor means, said trap signal energizing said I-module means, said I-module means of the one processor preventing a current instruction from being re-executed and preventing a next instruction from being executed in response to said trap signal.

3. In a multiprocessor computer system including a plurality of processors, service processor means connected to the plurality of processors for developing an output signal in the event a failure occurs within one of the processors, a main memory connected to the plurality of processors for supplyihg instructions and data, and control means disposed within each of the processors for controlling the operation of the processor, remaining ones of said plurality of processors attempting to search for data in the one processor prior to searching for the data in the main memory, the one processor developing a miss signal in response thereto when said data is not stored in the one processor or said data is stored in the one processor but is not valid, said control means of the one processor comprising:

means connected to said service processor means and responding to said miss signal or to said output signal from said service processor means for transmitting a special signal from the one processor to the remaining ones of said plurality of processors in the event said data is not stored in the one processor, said data is stored in the one processor but is not valid, or said failure occurs within the one processor, said remaining ones of said plurality of processors neglecting to search for the data in the one processor and searching for the data in the main memory in response to said special signal, the means for transmitting including, latch circuit means for generating a set signal in response to said output signal from said service processor means, and gate means for generating an output signal in response to said set signal or in response to said miss signal, said means transmitting said special signal in response to said output signal from said gate means.

* * * * *